United States Patent
Kim et al.

(10) Patent No.: US 9,948,609 B2
(45) Date of Patent: Apr. 17, 2018

(54) CLOUD-BASED MAIL SYSTEM AND MAIL SERVICE METHOD FOR PROVIDING IMPROVED SECURITY

(71) Applicant: NHN Entertainment Corporation, Seongnam-si (KR)

(72) Inventors: Ilhwan Kim, Seongnam-si (KR); Seonghwan Jeong, Seongnam-si (KR)

(73) Assignee: NHN Entertainment Corporation, Seongnam-si (KR)

(*) Notice: Subject to any disclaimer, the term of this patent is extended or adjusted under 35 U.S.C. 154(b) by 158 days.

(21) Appl. No.: 14/796,664

(22) Filed: Jul. 10, 2015

(65) Prior Publication Data
US 2016/0014089 A1    Jan. 14, 2016

(30) Foreign Application Priority Data

Jul. 11, 2014  (KR) .................. 10-2014-0087360

(51) Int. Cl.
*H04L 29/06*    (2006.01)
*H04L 12/58*    (2006.01)

(52) U.S. Cl.
CPC .......... *H04L 63/0281* (2013.01); *H04L 51/22* (2013.01); *H04L 63/0428* (2013.01)

(58) Field of Classification Search
CPC . H04L 63/0428; H04L 63/0281; H04L 51/22; H04W 12/04
USPC .......................................... 713/153
See application file for complete search history.

(56) References Cited

U.S. PATENT DOCUMENTS

| | | | |
|---|---|---|---|
| 2004/0236752 A1 | 11/2004 | Han et al. | |
| 2010/0145932 A1 | 6/2010 | Rook et al. | |
| 2012/0317655 A1* | 12/2012 | Zhang | G06F 21/6218 726/28 |
| 2012/0331283 A1* | 12/2012 | Chandran | H04L 9/088 713/150 |

(Continued)

FOREIGN PATENT DOCUMENTS

| | | |
|---|---|---|
| KR | 10-2004-0100919 | 12/2004 |
| KR | 10-2008-0051528 | 6/2008 |

(Continued)

OTHER PUBLICATIONS

Hyun-Bo Shim, "The Technology of Personal Cloud Computing and Market Research", Journal of the Korea Institute of Information and Communication Engineering, vol. 18, No. 2, Feb. 2014, pp. 239-251.

*Primary Examiner* — Yogesh Paliwal
(74) *Attorney, Agent, or Firm* — H.C. Park & Associates, PLC

(57) ABSTRACT

Provided are a cloud-based mail system and a mail service method for providing an improved security. The cloud-based mail system including: an e-mail transmission manager configured to encode an e-mail received from a terminal of a user or an external mail server with a first key, and to forward the e-mail encoded with the first key to a cloud mail server that provides a cloud mail service, the first key being configured to be inaccessible by the cloud mail server; and a communication interface to transmit the e-mail encoded with the first key to the cloud mail server. The e-mail encoded with the first key is configured to be encoded at the cloud mail server with a second key of the cloud mail server and stored in a storage of the cloud mail server.

15 Claims, 10 Drawing Sheets

(56) References Cited

U.S. PATENT DOCUMENTS

2013/0305039 A1* 11/2013 Gauda ................ G06F 21/6218
  713/153

FOREIGN PATENT DOCUMENTS

| KR | 10-2011-0102881 | 9/2011 |
| KR | 10-1374594 | 3/2014 |

* cited by examiner

CLOUD-BASED MAIL SYSTEM AND MAIL SERVICE METHOD FOR PROVIDING IMPROVED SECURITY

CROSS-REFERENCE TO RELATED APPLICATION

This application claims priority from and the benefit of Korean Patent Application No. 10-2014-0087360, filed on Jul. 11, 2014, which is hereby incorporated by reference for all purposes as if fully set forth herein.

BACKGROUND

Field

Exemplary embodiments relate to a cloud-based mail system and a mail service method for providing improved security.

Discussion of the Background

In general, an electronic mail (e-mail) system includes servers configured to transmit and receive emails, and a storage configured to store the emails. In the related art, companies have built servers and storage as a separate infrastructure for an email system.

Currently, many companies are utilizing a cloud mail service instead of constructing a separate self-infrastructure. Using the cloud mail service, an infrastructure, for example, equipment, a space for equipment, and a network, used to construct the e-mail system is not required for service providers, such as companies used to construct an email system. Costs for operating the e-mail system, such as processing spam e-mail, may be reduced by using cloud-based email systems.

FIG. 1 is a diagram illustrating a cloud mail service according to the related art. Referring to FIG. 1, a system 100 for a cloud mail service may include a server, such as an Internet message access protocol (IMAP) server 110 or a post office protocol 3 (POP3) server 130, configured to receive an e-mail to be transferred to a user, a server, such as a simple mail transfer protocol (SMTP) server 120, configured to transmit an e-mail created by the user, and a storage 140 configured to store user mail content. For example, the system 100 may transfer e-mails to terminals 160 of users over a network such as the Internet 150, and may receive e-mails created by the users, from the terminals 160 of the users, to transfer the received e-mails to receivers of the e-mails through a sending server.

The cloud mail service according to the related art may reduce costs, e.g., operating costs, since construction of a separate infrastructure or a great effort for system repair and maintenance is not required. However, the cloud mail service may have security issues.

For example, mail security may be classified into a security for a transport layer regarding a safety level at which a mail is to be transmitted and a security for a storage regarding a method of safely storing a mail. Here, the transport layer may be processed in a relatively safe manner using a verified security method such as a secure sockets layer (SSL) and a transport layer security.

In terms of the security for the storage, the cloud mail service may not achieve a fundamental security irrespective of improving the security using a variety of encoding techniques such as content encoding using an encoding algorithm, encoding at a file system level, and encoding at a block device level. The cloud mail service may not achieve the fundamental security since a provider of the cloud mail service holds a key, for example, a key 170, used to encode the storage 140. Technically, the provider of the cloud mail service may decode and refer to e-mail contents of a user using the key 170 if necessary. Also, since the security of the cloud mail service is vulnerable, the key 170 may be obtained by an unauthorized user due to various security issues, such as an attack of a hacker or negligence of a manager.

SUMMARY

Exemplary embodiments provide a cloud-based mail system and a mail service method that may outperform a fundamental security issue of a cloud mail service by maintaining a separate key inaccessible by a mail service provider through a system separate from a system that provides the cloud mail service.

Additional features of the invention will be set forth in the description which follows, and in part will be apparent from the description, or may be learned by practice of the invention.

An exemplary embodiment discloses a cloud-based mail system including: an e-mail transmission manager configured to encode an e-mail received from a terminal of a user or an external mail server with a first key, and to forward the e-mail encoded with the first key to a cloud mail server that provides a cloud mail service, the first key being configured to be inaccessible by the cloud mail server; and a communication interface to transmit the e-mail encoded with the first key to the cloud mail server. The e-mail encoded with the first key is configured to be encoded at the cloud mail server with a second key of the cloud mail server and stored in a storage of the cloud mail server.

An exemplary embodiment also discloses a cloud-based mail system including: an e-mail transmission manager configured to encode an e-mail received from a terminal of a user or an external mail server with a key of the cloud-based mail system, and to provide the encoded e-mail to a cloud mail server that provides a cloud mail service; a sharing cache configured to store the encoded e-mail; and an e-mail reception manager configured to receive the encoded e-mail stored in the sharing cache or the encoded e-mail stored in the cloud mail server, to decode the received encoded e-mail based on the key of the cloud-based mail system, and to provide the decoded e-mail to the terminal of the user, in response to a request from the terminal of the user.

An exemplary embodiment also discloses a mail service method performed by a cloud-based mail system, the method including: encoding an e-mail received from a terminal of a user or an external mail server with a first key, and transmitting the e-mail encoded with the first key to a cloud mail server that provides a cloud mail service, the first key being configured to be inaccessible by the cloud mail server; and transmitting the e-mail encoded with the first key to the cloud mail server. The e-mail encoded with the first key is configured to be encoded at the cloud mail server with a second key of the cloud mail server and stored in a storage of the cloud mail server.

An exemplary embodiment also discloses a mail service method performed by a cloud-based mail system, the method including: encoding an e-mail received from a terminal of a user or an external mail server with a key of the cloud-based mail system, and providing the encoded e-mail to a cloud mail server that provides a cloud mail service; storing the encoded e-mail in a sharing cache; and receiving the encoded e-mail stored in the sharing cache or the encoded e-mail stored in the cloud mail server, decoding the received encoded e-mail based on the key of the cloud-based mail system, and providing the decoded e-mail to the terminal of the user, in response to a request from the terminal of the user.

An exemplary embodiment also discloses a non-transitory computer-readable medium having stored thereon processor-executable instructions that causes a cloud-based mail system including a processor to perform: encoding an e-mail received from a terminal of a user or an external mail server with a first key, and transmitting the e-mail encoded with the first key to a cloud mail server that provides a cloud mail service, the first key being configured to be inaccessible by the cloud mail server; and transmitting the e-mail encoded with the first key to the cloud mail server. The e-mail encoded with the first key is configured to be encoded at the cloud mail server with a second key of the cloud mail server and stored in a storage of the cloud mail server.

It is to be understood that both the foregoing general description and the following detailed description are exemplary and explanatory and are intended to provide further explanation of the invention as claimed.

According to an exemplary embodiment, it is possible to outperform a fundamental security issue of a cloud mail service by maintaining a separate key inaccessible by a mail service provider through a system separate from a system that provides the cloud mail service.

According to an exemplary embodiment, it is possible to further add functionality, such as an enhanced spam filter and a virus vaccine, not provided from a cloud mail service, through a cloud-based mail system.

According to an exemplary embodiment, it is possible to further add a function of supplementing a portion of functions provided from a cloud mail service.

According to an exemplary embodiment, since a cloud-based mail system caches mail content and a user is enabled to obtain the mail content at a location physically close to the user, it is possible to improve performance as perceived by the user.

According to an exemplary embodiment, it is possible to reduce infrastructure costs by configuring a plurality of constituent elements included in a cloud-based mail system into a single physical module, i.e., a box of an appliance form, and to enable horizontal scalability by adding boxes based on the number of users.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
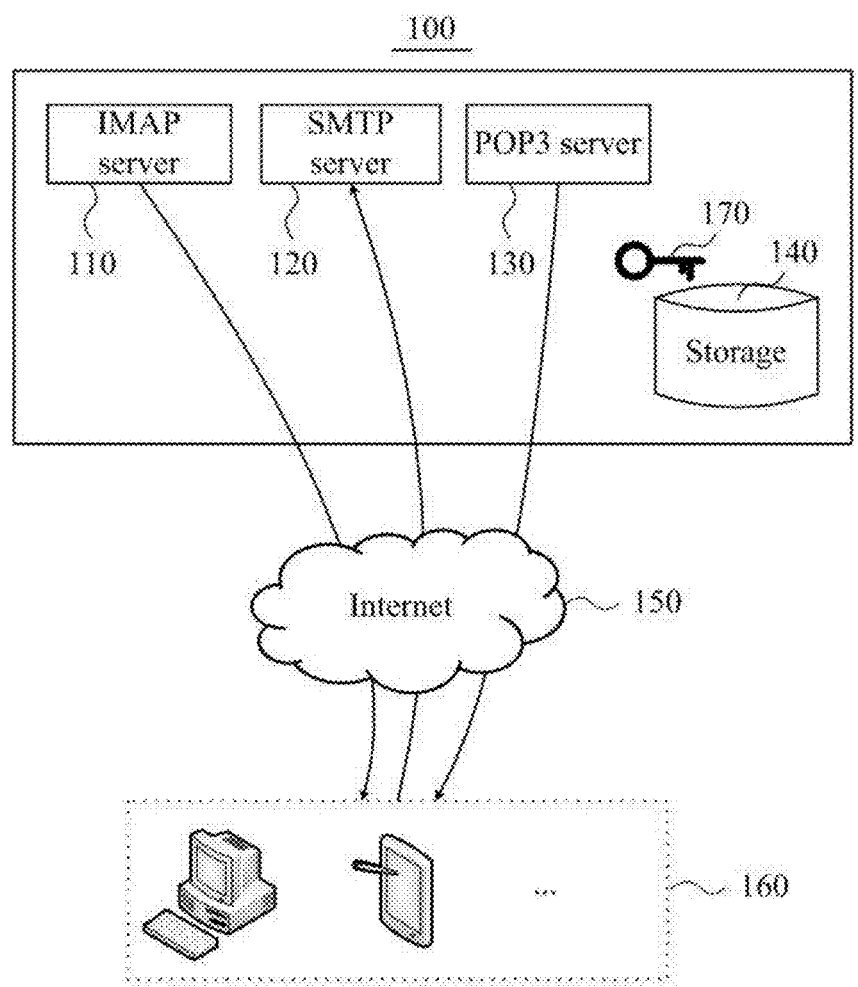
FIG. 1 is a diagram illustrating a cloud mail service according to the related art.

Exemplary embodiments will be described in detail with reference to the accompanying drawings. These exemplary embodiments will be described in detail for those skilled in the art in order to practice the present disclosure. It should be appreciated that various exemplary embodiments are different but do not have to be exclusive. For example, specific shapes, configurations, and characteristics described in an exemplary embodiment may be implemented in another embodiment without departing from the spirit and the scope of the present disclosure. In addition, it should be understood that position and arrangement of individual components in each disclosed exemplary embodiment may be changed without departing from the spirit and the scope of the present disclosure. Therefore, a detailed description described below should not be construed as being restrictive. In addition, the scope of the present disclosure is defined only by the accompanying claims and their equivalents if appropriate. Similar reference numerals will be used to describe the same or similar functions throughout the accompanying drawings. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The terminology used herein is for the purpose of describing example embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements and/or components, but do not preclude the presence or addition of one or more other features, integers, steps, operations, elements, components, and/or groups thereof.

It will be understood that when an element is referred to as being "connected to" another element, it can be directly connected to the other element, or intervening elements may be present.

Hereinafter, exemplary embodiments are described in detail with reference to the accompanying drawings.

Figure 2:
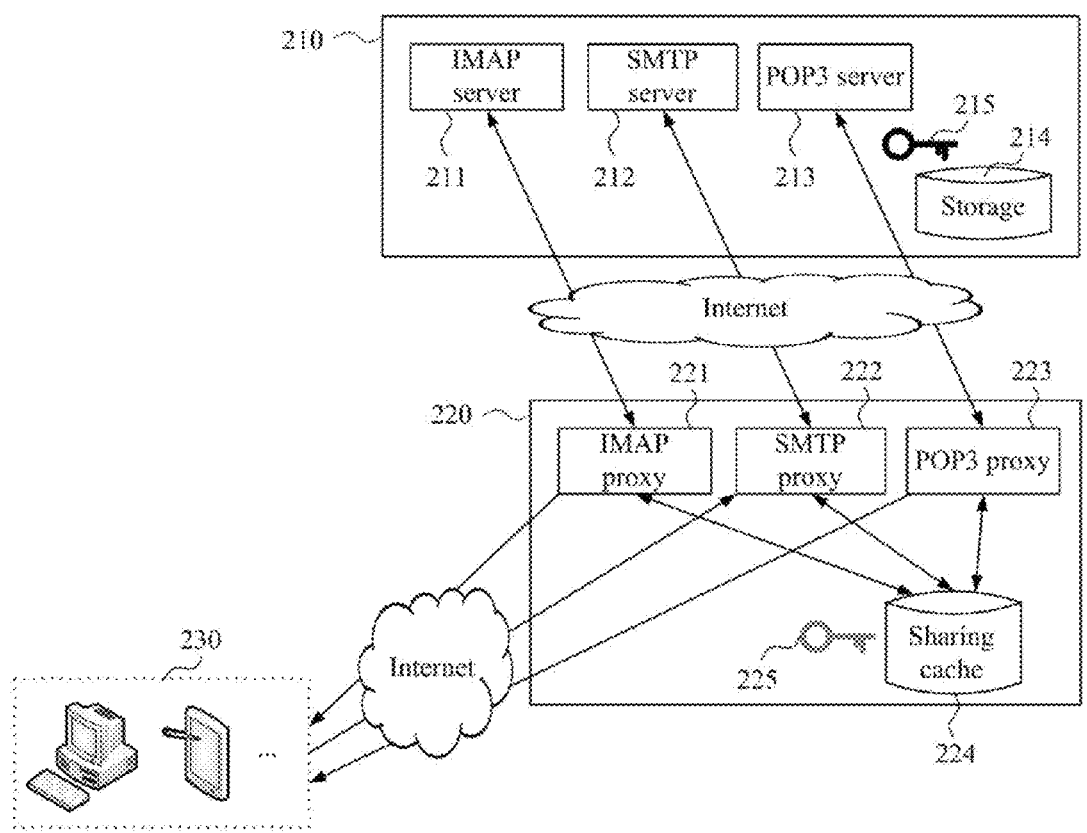
FIG. 2 is a diagram illustrating a cloud mail service according to an exemplary embodiment.

FIG. 2 is a diagram illustrating a cloud mail service according to an exemplary embodiment. FIG. 2 illustrates a system for a cloud mail service (hereinafter, a cloud mail service system) 210 and a cloud-based mail system 220.

The cloud mail service system 210 may include a server, such as an Internet message access protocol (IMAP) server 211 or a post office protocol 3 (POP3) server 213, configured to receive an e-mail to be transferred to a user, a user mail collecting and transmitting server, such as a simple mail transfer protocol (SMTP) server 212, configured to transmit an e-mail created by the user, and a storage 214 configured to store user mail content. Mail contents may be encoded using a key 215 for encoding, and may be stored and managed in the storage 214.

From the perspective of a mail service, a relatively small amount of cost is required to construct the infrastructure for transmitting and receiving mails, while a relatively large amount of cost is required to construct the infrastructure for storage.

Accordingly, the cloud-based mail system 220 according to an exemplary embodiment may transfer an e-mail to the user or may transmit an e-mail created by the user using an IMAP proxy 221, an SMTP proxy 222, and a POP3 proxy 223. Mail contents may be stored using the storage 214 of the cloud mail service system 210. FIG. 2 further illustrates terminals 230 available by users.

A sharing cache 224 included in the cloud-based mail system 220 may refer to a sharing storage simultaneously accessible from a plurality of constituent elements, for example, the IMAP proxy 221, the SMTP proxy 222, and the POP3 proxy 223, included in the cloud-based mail system 220, in order to reduce a response time for a request from the user. The sharing cache 224 may be configured with a relatively small capacity compared to the storage 214 of the cloud mail service system 210. Mail content has a spatial locality for each user. Thus, the performance of the cloud mail service perceived by the user may be improved by configuring the cloud-based mail system 220 at a distance physically close to the user and by decreasing a response time to a request from the user through the sharing cache 224.

In an example, it is assumed that the cloud mail service system 210 is located in 'America' and the cloud-based mail system 220 is located in a company of a user working in 'Korea'. All of the mails associated with the user may not be stored in the sharing cache 224. However, recently used mails or frequently used mails may be stored in advance in the sharing cache 224. In this example, the cloud-based mail system 220 may immediately provide mail content to the user located in the physically same company through the sharing cache 224 instead of using the storage 214 of the cloud mail service system 210 that is located in 'America'. Thus, it may be possible to improve a response time performance to be perceived by the user. In another example, the cloud mail service system 210 may be located in California, and the cloud-based mail system 220 may be located in Virginia. As described above, the cloud-based mail system 220 may be provided at a geographical location determined in association with the user. The cloud-based mail system 220 may be provided in the same city or administrative district in which the user lives or works, as well as the company with which the user works. Further, the cloud-based mail system 220 may be provided in a country in which the user lives or works.

Hereinafter, a method of achieving the security of a cloud mail service by utilizing the cloud-based mail system 220 according to an exemplary embodiment will be described. The POP3 server 213 or the POP3 proxy 223 may be a logically same constituent element as the IMAP 211 or the IMAP proxy 221 and thus, a description related thereto will be omitted.

Figure 3:
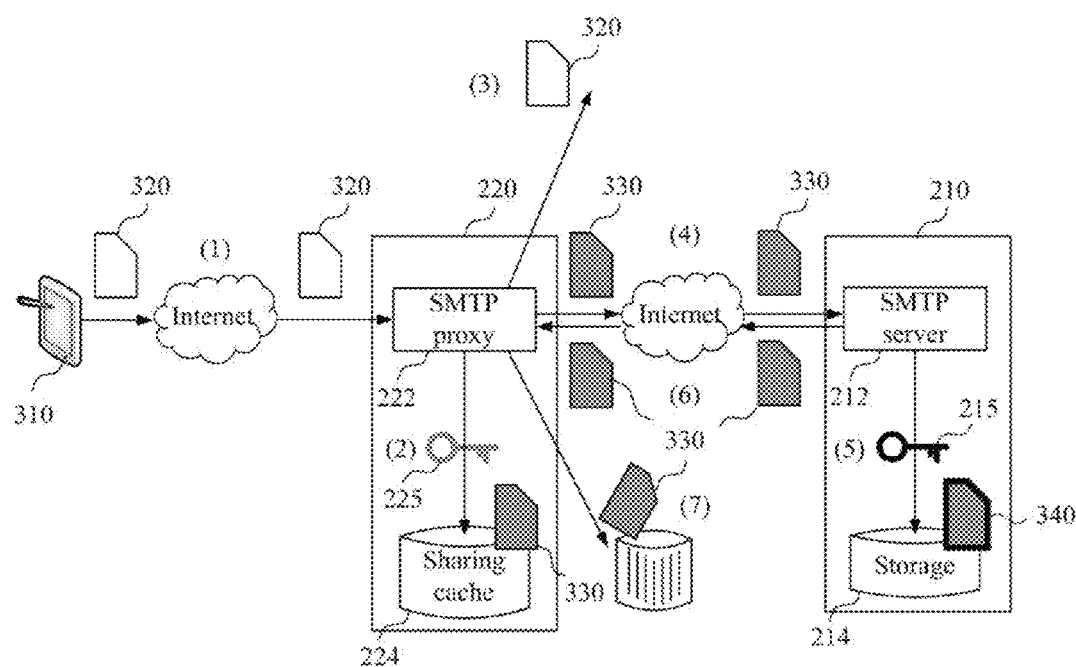
FIG. 3 illustrates a process in which a user transmits a mail according to an exemplary embodiment.

FIG. 3 illustrates a process in which a user transmits a mail according to an exemplary embodiment.

In process (1), a user may transmit mail content 320 to the SMTP proxy 222 of the cloud-based mail system 220 through a secure channel, for example, a security sockets layer (SSL) or a transport layer security (TLS) using a terminal 310. Here, the mail content 320 may be data not encoded for a secure transmission. In process (1), the mail content 320 may be transmitted to the SMTP proxy 222 over the Internet as illustrated in FIG. 3. However, when the cloud-based mail system 220 is constructed in the same company, the mail content 320 may be transmitted to the SMTP proxy 222 over a local area network (LAN) or a wireless LAN (WLAN).

In process (2), the SMTP proxy 222 may store the received mail content 320 in the sharing cache 224. Here, the SMTP proxy 222 may encode the mail content 320 with the key 225 inaccessible by a provider that provides a cloud mail service, and may store the encoded mail content 330 in the sharing cache 224.

When the cloud-based mail system 220 is used as a company mail system, the user may receive a mail through the cloud-based mail system 220. In this example, a mail cached in the sharing cache 224 may be used instead of using a remote cloud mail service system 210 and may be provided in a relatively quick response time because of the physical proximity.

In process (3), the SMTP proxy 222 may transmit the received mail content 320 to a destination to which the received mail content 320 is to be transferred. As described above, in the mail service, a relatively small amount of cost is required to construct the infrastructure for transmitting and receiving mails.

In process (4), the SMTP proxy 222 may transmit encoded mail content 330 to the SMTP server 212 of the cloud mail service system 210 through a secure channel. Here, to receive again the encoded mail content 330 from the cloud mail service system 210, the SMTP proxy 222 may modulate a receiver to the SMTP proxy 222 of the cloud-based mail system 220. The receiver modulation will be further described with reference to process (6) and process (7).

In process (5), the SMTP server 212 may encode again the received encoded mail content 330 with the key 215 inaccessible by the user and may store twice-encoded mail content 340 in the storage 214. The twice-encoded mail content 340 may not be decoded completely using only the key 215 of the provider of the cloud mail service. Thus, it is possible to safely protect the content regardless of mail exposure due to the vulnerability of the cloud mail service.

In process (6), the SMTP server 212 may transmit the encoded mail content 330 to the destination. As described above, the receiver of the encoded mail content 330 is modulated to the SMTP proxy 222 of the cloud-based mail system 220 and thus, the encoded mail content 330 may be echoed to the SMTP proxy 222 of the cloud-based mail system 220.

For example, when the encoded mail content 330 is transferred to the receiver before modulation, the receiver may receive all of the mail content 320 transferred in process (3) and the encoded mail content 330. Accordingly, to prevent an unnecessary transfer, the receiver may be modulated to the SMTP proxy 222 of the cloud-based mail system 220 in process (4).

In process (7), the SMTP proxy 222 may delete the echoed encoded mail content 330. Since the encoded mail content 330 is stored in the sharing cache 224 in process (2), the echoed encoded mail content 330 may not be necessary and thus, the SMTP proxy 222 may delete the echoed encoded mail content 330.

Figure 4:
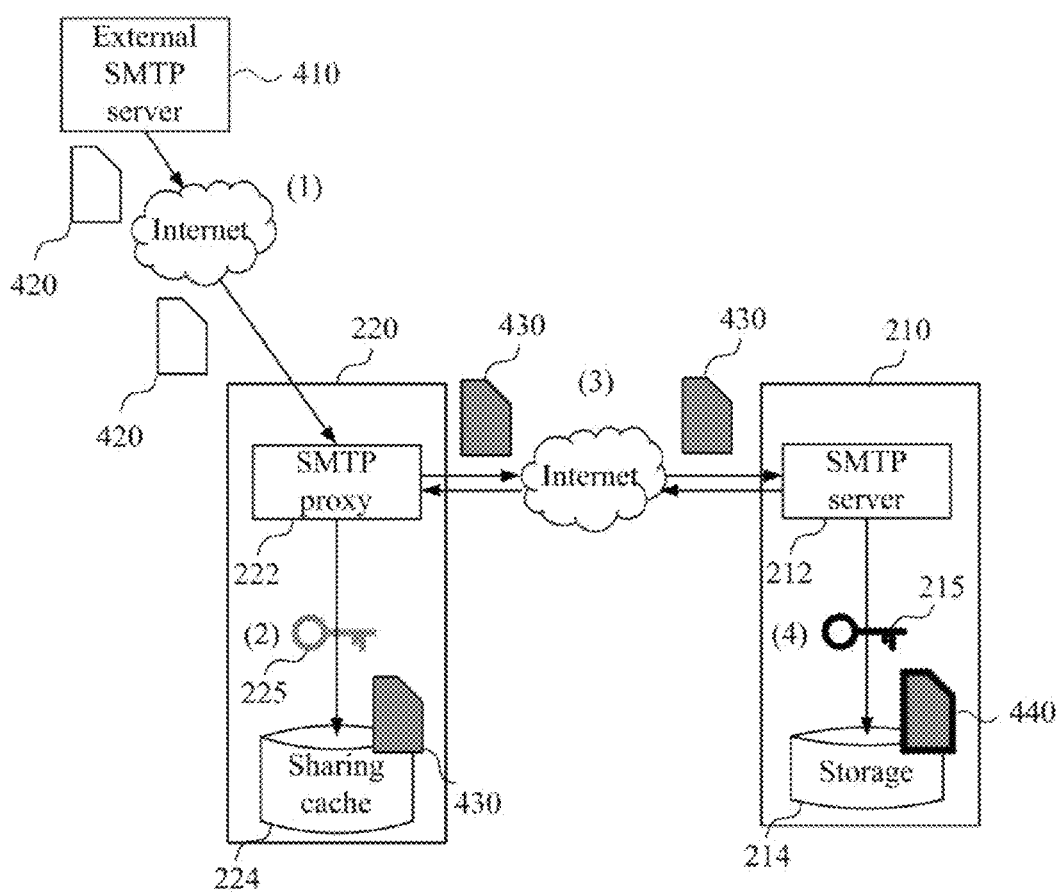
FIG. 4 illustrates a process of processing a mail transferred from an external simple mail transfer protocol (SMTP) server according to an exemplary embodiment.

FIG. 4 illustrates a process of processing a mail transferred from an external SMTP server according to an exemplary embodiment.

In process (1), an external SMTP server 410 may transfer mail content 420 to the SMTP proxy 222 of the cloud-based mail system 220 through a secure channel.

In process (2), the SMTP proxy 222 may encode the mail content 420 with the key 225 inaccessible by a provider of a cloud mail service, and may store the encoded mail content 430 in the sharing cache 224.

In process (3), the SMTP proxy 222 may transmit encoded mail content 430 to the SMTP server 212 of the cloud mail service system 210 through a secure channel.

In process (4), the SMTP server 212 may encode again the received encoded mail content 430 with the key 215 inaccessible by a user, and may store twice-encoded mail content 440 in the storage 214. As described above, the twice-encoded mail content 440 may not be decoded completely using only the key 215 of the provider of the cloud mail service. Thus, it is possible to safely protect the content regardless of mail exposure due to the vulnerability of the cloud mail service.

Figure 5:
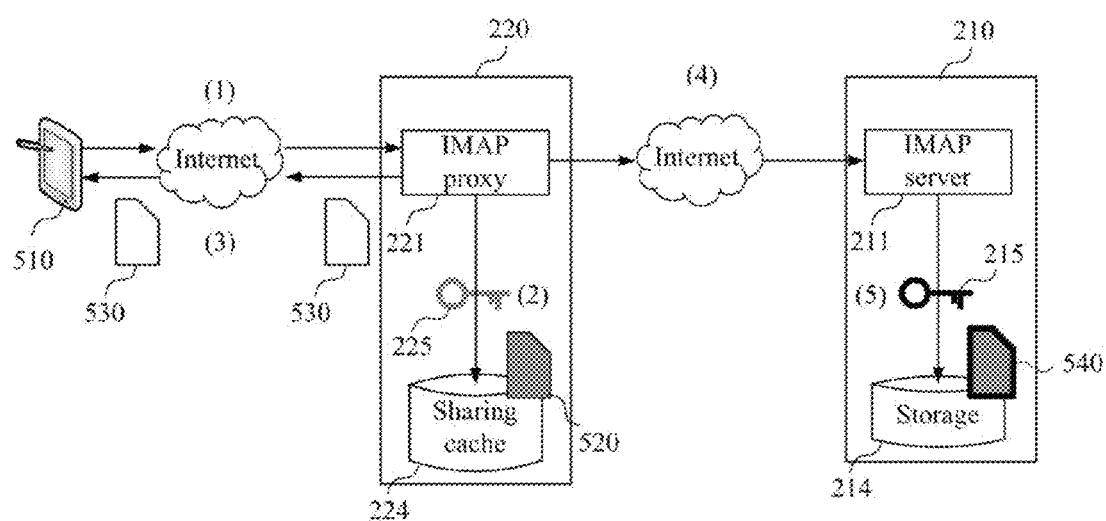
FIG. 5 illustrates a process of providing a mail to a user according to an exemplary embodiment.

FIG. 5 illustrates a process of providing a mail to a user according to an exemplary embodiment. FIG. 5 illustrates an example in which the mail requested from the user is present in the sharing cache 224, which may be represented as cache hit.

In process (1), the user may request the IMAP proxy 221 of the cloud-based mail system 220 for a mail import through a secure channel using a terminal 510.

In process (2), the IMAP proxy 221 verifies whether requested information, for example, encoded mail content 520 is present in the sharing cache 224, and may decode the encoded mail content 520 with the key 225 of the cloud-based mail system 220, for example, a key inaccessible by a provider of a cloud mail service when the requested information is present.

In process (3), the IMAP proxy 221 may transfer decoded mail content 530 to the terminal 510 of the user through the secure channel.

In process (4), the IMAP proxy 221 may request the IMAP server 211 of the cloud mail service system 210 for updating meta information of corresponding mail content 540, (e.g., metadata of corresponding mail content 540).

In process (5), the IMAP proxy 211 may update the meta information of the corresponding mail content 540 in response to the request of process (4).

Figure 6:
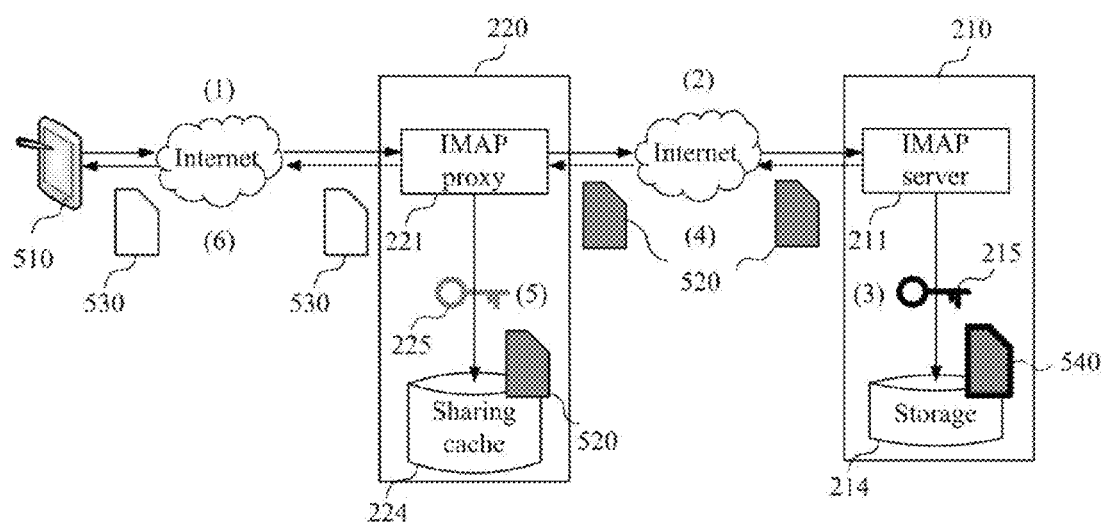
FIG. 6 illustrates a processing process in response to an absence of a requested mail in a sharing cache according to an exemplary embodiment.

FIG. 6 illustrates a processing process in response to an absence of a requested mail in a sharing cache according to an exemplary embodiment. FIG. 6 illustrates an example in which a mail requested from a user is absent in a sharing cache 224, which may be represented as a cache miss.

In process (1), similar to process (1) of FIG. 5, the user may request the IMAP proxy 221 of the cloud-based mail system 220 for a mail import through a secure channel using the terminal 510.

In process (1), when requested information, for example, the encoded mail content 520 is absent in the sharing cache 224, the IMAP proxy 221 may request the IMAP server 211 of the cloud mail service system 210 for the mail import.

In process (3), the IMAP server 211 may obtain the twice-encoded mail content 540 from the storage 214, and may decode the twice-encoded mail content 540 with the key 215, for example, a key inaccessible by the user of the terminal 510, of the cloud mail service system 210. As a result of decoding, the mail content 520 encoded with the key 225 of the cloud-based mail system 220 may be obtained.

In process (4), the IMAP server 211 may transfer the encoded mail content 520 to the IMAP proxy 221 through a secure channel between the IMAP server 211 and the IMAP proxy 221.

In process (5), the IMAP proxy 221 may store the encoded mail content 520 in the sharing cache 224. Since the encoded mail content 520 is encoded with the key 225 of the cloud-based mail system 220, a separate encoding process is not required and a matching test may be performed if necessary.

In process (6), the IMAP proxy 221 may decode the encoded mail content 520 with the key 225 of the cloud-based mail system 220 and may provide the encoded mail content 530 to the terminal 510 of the user through the secure channel between the terminal 510 and the cloud-based mail system 220.

In the cloud-based mail system 220 according to an exemplary embodiment, the entire constituent elements may be integrated in a single physical rack, box, or an appliance form.

Figure 7:
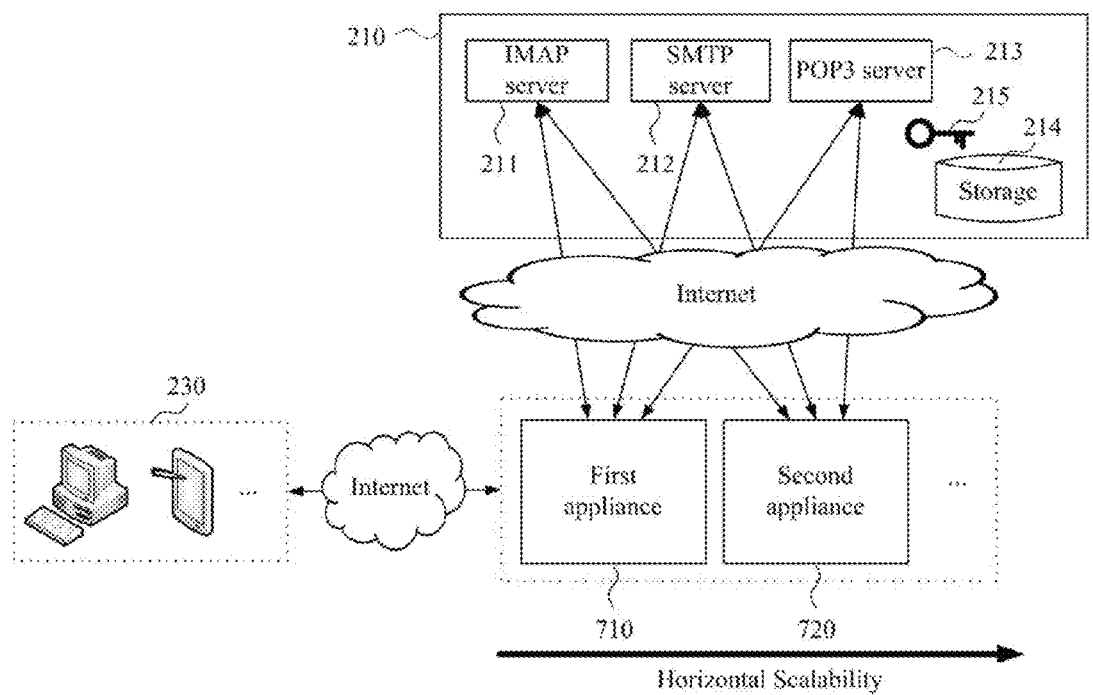
FIG. 7 illustrates a cloud-based mail system integrated into a single physical box of an appliance form according to an exemplary embodiment.

FIG. 7 illustrates a cloud-based mail system integrated into a single physical box of an appliance form according to an exemplary embodiment. Referring to FIG. 7, the cloud-based mail system may be integrated into a single physical box of an appliance form such as a first appliance 710 and a second appliance 720, and may have a horizontal scalability capable of expanding a system capacity by additionally increasing the number of appliances according to an increase in the number of users. A terminal 230 may communicate with one of the appliances, e.g., first appliance 710, if the location of the terminal 230 corresponds to the location of the first appliance 710. Each of appliances, e.g., the first appliance 710, a second appliance 720, etc., may communicate with the cloud mail service system 210 shown in FIG. 7. The cloud mail service system 210 illustrated in FIG. 7 may have similar structural configurations as the cloud mail service system 210 illustrated in other figures. Thus, detailed description regarding the IMAP server 211, the SMTP server 212, the POP3 server 213, the storage 214, and the key 215 will be omitted.

Figure 8:
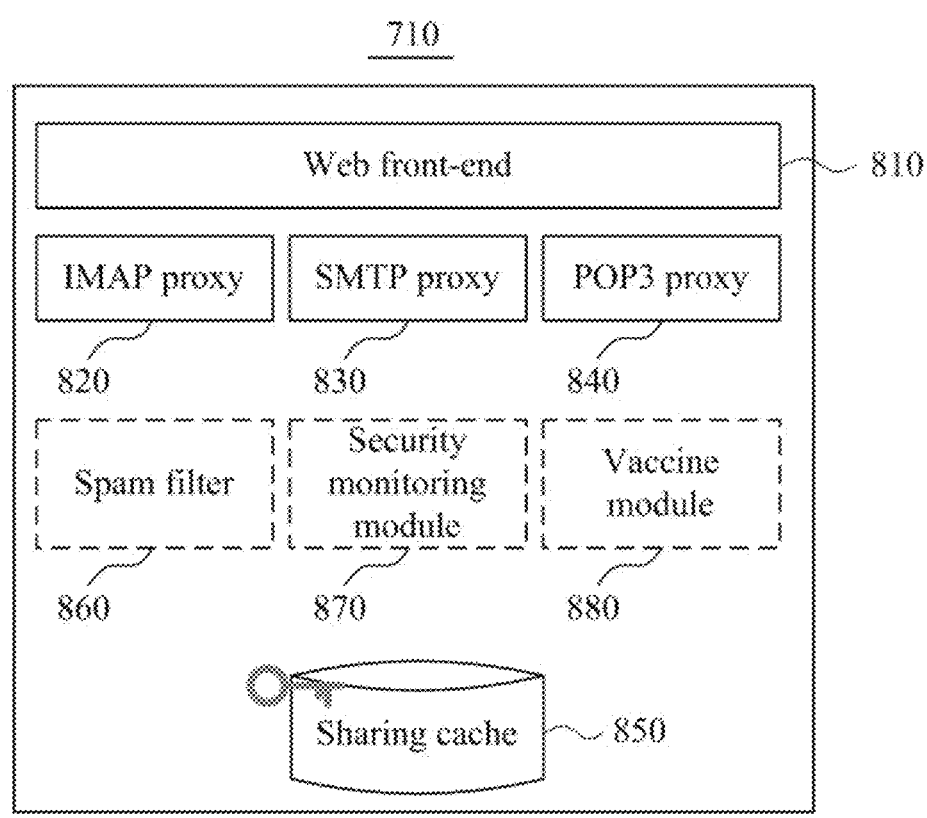
FIG. 8 is a block diagram illustrating a configuration of a cloud-based mail system integrated into a single physical box of an appliance form according to an exemplary embodiment.

FIG. 8 is a block diagram illustrating a configuration of a cloud-based mail system integrated into a single physical box of an appliance form according to an exemplary embodiment. FIG. 8 illustrates a configuration of the first appliance 710 of FIG. 7.

The first appliance 710 may include a web front-end 810 that is a network interface for communicating with the cloud mail service system 210.

Also, the first appliance 710 may be integrated into a single physical box by further including an IMAP proxy 820, an SMTP proxy 830, a POP3 proxy 840, and a sharing cache 850, which are corresponding to the IMAP proxy 221, the SMTP proxy 222, the POP3 proxy 223, and the sharing cache 224 of FIG. 2, respectively.

The first appliance 710 may be integrated into a single physical box by optionally further including separate constituent elements such as a spam filter 860, a security monitoring module 870, and a vaccine module 880, and thereby include all of functions for a mail service.

Compared to the related art using only the cloud mail service, the cloud-based mail system integrated into a single physical box may additionally require a relatively small amount of infrastructure costs. The cloud-based mail system integrated into a single physical box may not require a great amount of cost since the cloud-based mail system is physically integrated and does not require a large storage, for example, the storage 214 of FIG. 2 that stores all mail contents. As described above, the storage 214 may require a relatively large amount of infrastructure costs.

As described above, in the related art using only the cloud mail service, only a provider of the cloud mail service owns a key used for encoding and is allowed to read a mail of the user if necessary. Accordingly, the mail of the user may be leaked due to the vulnerability of the cloud mail service. However, the cloud-based mail system according to an exemplary embodiment may achieve various advantages of the cloud mail service and may outperform the aforementioned security issues using an encoding key of the cloud-based mail system as well as the encoding key of the cloud mail service.

Figure 9:
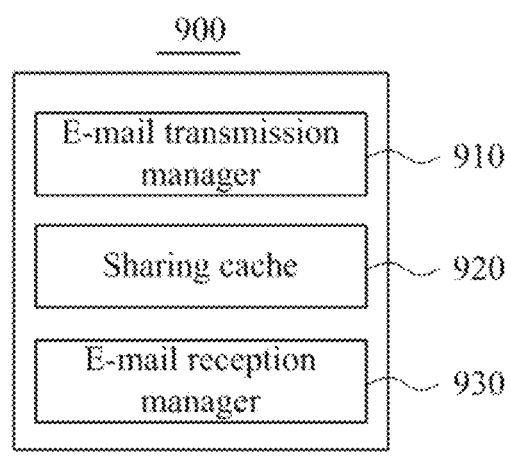
FIG. 9 is a block diagram illustrating a configuration of a cloud-based mail system according to an exemplary embodiment.
Figure 10:
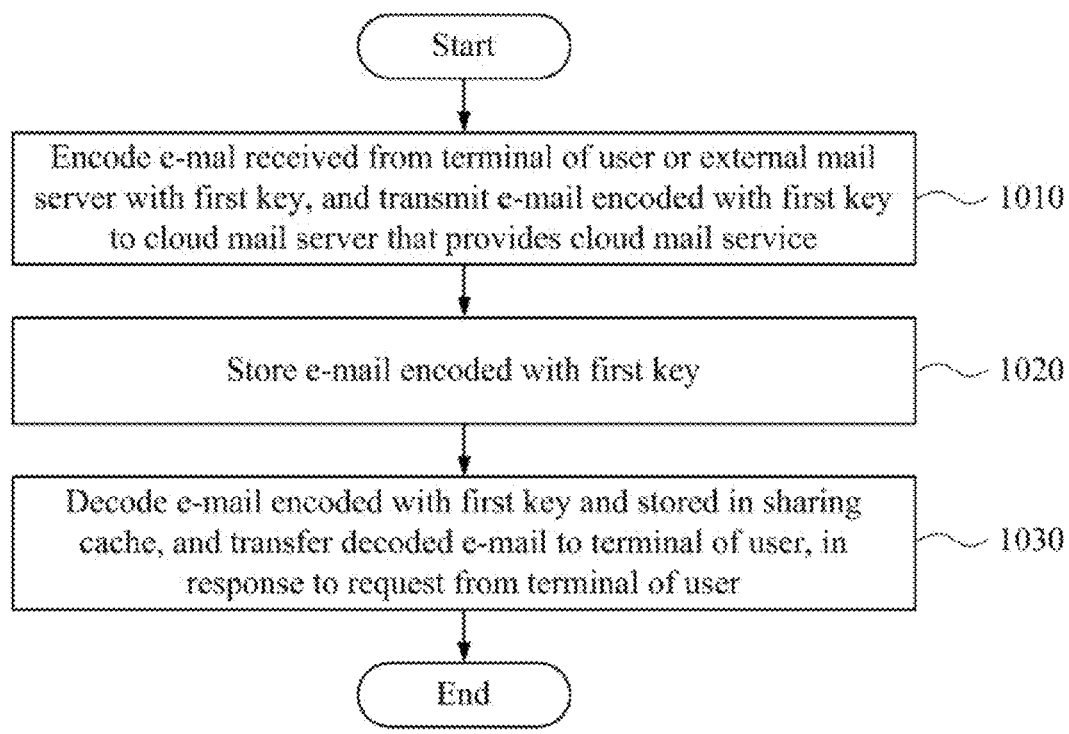
FIG. 10 is a flowchart illustrating a mail service method of a cloud-based mail system according to an exemplary embodiment.

FIG. 9 is a block diagram illustrating a configuration of a cloud-based mail system according to an exemplary embodiment, and FIG. 10 is a flowchart illustrating a mail service method of a cloud-based mail system according to an exemplary embodiment.

A cloud-based mail system 900 of FIG. 9 may correspond to the cloud-based mail system 220 described above with reference to FIG. 2 through FIG. 6 or one of the appliances described above with reference to FIG. 7 and FIG. 8.

Referring to FIG. 9, the cloud-based mail system 900 may include an e-mail transmission manager 910, a sharing cache 920, and an e-mail reception manager 930.

FIG. 9 illustrates an example in which the cloud-based mail system 900 includes all of the e-mail transmission manager 910, the sharing cache 920, and the e-mail reception manager 930. In this example, the e-mail transmission manager 910 may be configured to include a function of the SMTP proxy 222 or the POP3 proxy 223 of FIG. 2 through FIG. 7, the e-mail reception manager 930 may be configured to include a function of the IMAP proxy 221 of FIG. 2 through FIG. 7, and the sharing cache 920 may be configured to include a function of the sharing cache 224 of FIG. 2 through FIG. 7.

According to an exemplary embodiment, the e-mail transmission manager 910 may be configured to include a function of the SMTP proxy 222 or the POP3 proxy 223 of FIG. 2 through FIG. 7, the e-mail reception manager 930 may be configured to include a function of the IMAP proxy 221 of FIG. 2 through FIG. 7, and the sharing cache 920 may be omitted.

Further, according to an exemplary embodiment, the e-mail transmission manager 910 may be configured to include a function of the SMTP proxy 222 or the POP3 proxy 223 of FIG. 2 through FIG. 7, and a function of the IMAP proxy 221 of FIG. 2 through FIG. 7. In this case, the e-mail reception manager 930 may be omitted and the sharing cache 920 may be selectively omitted.

Although not illustrated in FIG. 9, the cloud-based mail system 900 may further include a processor, a memory, a bus, and a network interface. For example, the e-mail transmission manager 910 and the e-mail reception manager 930 may be included in the processor and the memory may include an operating system (OS) and a mail service routine.

The memory, as non-transitory computer readable media, may include a permanent mass storage device such as random access memory (RAM), read only memory (ROM), and a disk drive. Also, program codes for the OS and the mail service routine may be stored in the memory. The software constituent elements may be loaded from non-transitory computer-readable media separate from the memory using a drive mechanism (not shown). The non-transitory computer-readable media may include computer-readable media such as a floppy disk, a tape, a DVD/CD-ROM drive, and a memory card. According to an exemplary embodiment, the software constituent elements may be loaded to the memory through the network interface, instead of using the non-transitory computer readable media. Here, the sharing cache 920 may be configured to use the memory.

The bus may enable communication and data transmission between the constituent elements of the cloud-based mail system 900. The bus may be configured using a high-speed serial bus, a parallel bus, a storage area network (SAN), and/or other appropriate communication technologies.

The network interface may be a computer hardware constituent element to connect the cloud-based mail system 900 to a computer network. The network interface may connect the cloud-based mail system 900 to the computer network through a wireless or wired connection.

The processor may be configured to process an instruction of a computer program by performing an arithmetic and logic operation, and an input/output (I/O) operation of the cloud-based mail system 900. The instruction may be provided from the memory or the network interface to the processor. The processor may be configured to execute program codes for the e-mail transmission manager 910 and the e-mail reception manager 930. The program codes may be stored (e.g., the mail service routine) in a storage device such as the memory.

Here, the e-mail transmission manager 910 and the e-mail reception manager 930 included in the processor and the sharing cache 920 configured through the memory may be configured to perform operations 1010 through 1030 of FIG. 10. According to an exemplary embodiment, operations 1020 and 1030 may be omitted for other configurations.

In operation 1010, the e-mail transmission manager 910 may encode an e-mail received from a terminal of a user or an external mail server with a first key, and may transmit the e-mail encoded with the first key to a cloud mail server that provides a cloud mail service. The e-mail encoded with the first key may be encoded at the cloud mail server with a second key of the cloud mail server, and stored in a storage of the cloud mail server. The cloud mail server may correspond to the cloud mail service system 210 described above with reference to FIG. 2 through FIG. 7. The e-mail may correspond to mail content described above with reference to FIG. 2 through FIG. 8.

In this case, the first key may be managed to be inaccessible by the owner of the second key and the second key may be managed to be inaccessible by the user or the owner of the first key.

In operation 1020, the sharing cache 920 may store the e-mail encoded with the first key. For example, the storing may be performed according to a control of the e-mail transmission manager 910.

In operation 1030, the e-mail reception manager 930 may decode the e-mail encoded with the first key and stored in the sharing cache 920, and may transfer the decoded e-mail to the terminal of the user, in response to a request from the terminal of the user.

When the e-mail encoded with the first key is absent in the sharing cache 920, the e-mail reception manager 930 may request the cloud mail server for the e-mail encoded with the first key. In this instance, the e-mail encoded with the first key may be transferred from the cloud mail server to the e-mail reception manager by decoding, using the second key, the e-mail encoded at the cloud mail server with the first key and the second key and stored in the storage of the cloud mail server.

As described above with reference to FIG. 7 and FIG. 8, according to an exemplary embodiment, the cloud-based mail system 900 may integrate the e-mail transmission manager 910, the e-mail reception manager 930, and the sharing cache 920 in a single physical box of an appliance form. Here, at least one of a spam filter, a security monitoring module, and a vaccine module may be further optionally integrated into the single physical box or another physical box configured to communicate with single physical box.

According to an exemplary embodiment, when the e-mail is received from the terminal of the user in operation 1010, the e-mail transmission manager 910 may further transmit the e-mail to a receiver of the e-mail.

According to an exemplary embodiment, the cloud-based mail system 900 may be provided at a location associated with a location of the user, regardless of a geographical location of the cloud mail server.

According to an exemplary embodiment, it is possible to outperform a fundamental security issue of a cloud mail service by maintaining a separate key inaccessible by a mail service provider through a system separate from a system that provides a cloud mail service.

According to an exemplary embodiment, it is possible to further add a function, such as an enhanced spam filter and a virus vaccine, not provided from a cloud mail service, through a cloud-based mail system.

According to an exemplary embodiment, it is possible to further add a function of supplementing a portion of functions provided from a cloud mail service.

According to an exemplary embodiment, since a cloud-based mail system caches mail content and a user is enabled to obtain the mail content at a location physically close to the user, it is possible to improve a performance perceived by the user.

Exemplary embodiments illustrated herein may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments.

It will be apparent to those skilled in the art that various modifications and variation can be made in the present disclosure without departing from the spirit or scope of the disclosure. Thus, it is intended that the present disclosure cover the modifications and variations of this invention provided they come within the scope of the appended claims and their equivalents.

What is claimed is:

1. A cloud-based mail system comprising:
    a first processor configured with executable instructions to provide an e-mail transmission manager to encode an e-mail received from a terminal of a user or an external mail server with a first key, and to forward the e-mail encoded with the first key to a cloud mail server that provides a cloud mail service, the first key being inaccessible by the cloud mail server;
    a communication interface to transmit the e-mail encoded with the first key to the cloud mail server; and
    a second processor of the cloud mail server configured with executable instructions to encode the e-mail encoded with the first key with a second key of the cloud mail server that is stored in a storage of the cloud mail server.

2. The cloud-based mail system of claim 1, wherein the first processor is further configured with executable instructions to provide:
    a sharing cache to store the e-mail encoded with the first key; and
    an e-mail reception manager to decode the e-mail encoded with the first key and stored in the sharing cache, and to transfer the decoded e-mail to the terminal of the user, in response to a request from the terminal of the user.

3. The cloud-based mail system of claim 2, wherein the e-mail reception manager is configured to request the cloud mail server for the e-mail encoded with the first key, in response to determining an absence of the e-mail encoded with the first key in the sharing cache, and
    the e-mail encoded with the first key is transferred from the cloud mail server to the e-mail reception manager in response to the request of the e-mail reception manager,
    wherein the e-mail encoded with the first key and transferred from the cloud mail server has been generated by decoding, using the second key, the e-mail encoded with the first key at the cloud-based mail system, encoded with the second key at the cloud mail server, and stored in the storage.

4. The cloud-based mail system of claim 2, wherein the e-mail transmission manager is configured to integrate the e-mail reception manager and the sharing cache in a single physical box of an appliance form.

5. The cloud-based mail system of claim 4, wherein at least one of a spam filter, a security monitoring module, and a vaccine module is further integrated in the single physical box.

6. The cloud-based mail system of claim 1, wherein the e-mail transmission manager is configured to further transmit the e-mail to a receiving terminal of the e-mail in response to the e-mail being received from the terminal of the user.

7. The cloud-based mail system of claim 1, wherein the first key is managed to be inaccessible by an owner of the second key, and
    the second key is managed to be inaccessible by the user.

8. The cloud-based mail system of claim 1, wherein the cloud-based mail system is provided at a geographical location determined in association with the user regardless of a geographical location of the cloud mail server.

9. A mail service method performed by a cloud-based mail system, the method comprising:
    encoding an e-mail received from a terminal of a user or an external mail server with a first key, and transmitting the e-mail encoded with the first key to a cloud mail server that provides a cloud mail service, the first key being configured to be inaccessible by the cloud mail server; and transmitting the e-mail encoded with the first key to the cloud mail server,
wherein the e-mail encoded with the first key is configured to be encoded at the cloud mail server with a second key of the cloud mail server and stored in a storage of the cloud mail server.

10. The method of claim 9, further comprising:
storing the e-mail encoded with the first key in a sharing cache; and
decoding the e-mail encoded with the first key and stored in the sharing cache, and transferring the decoded e-mail to the terminal of the user, in response to a request from the terminal of the user.

11. The method of claim 10, wherein the decoding and the transferring comprises:
requesting the cloud mail server for the e-mail encoded with the first key, in response to determining an absence of the e-mail encoded with the first key in the sharing cache, and
receiving, by the e-mail reception manager, the e-mail encoded with the first key and transferred from the cloud mail server,
wherein the e-mail encoded with the first key and transferred from the cloud mail server has been generated by decoding, using the second key, the e-mail encoded with the first key at the cloud-based mail system, encoded with the second key at the cloud mail server, and stored in the storage.

12. The method of claim 10, wherein the encoding and the transmitting comprises further transmitting the e-mail to a receiving terminal of the e-mail in response to the e-mail being received from the terminal of the user.

13. The method of claim 9, wherein the first key is managed to be inaccessible by an owner of the second key, and
the second key is managed to be inaccessible by the user.

14. The method of claim 9, wherein the cloud-based mail system is provided at a geographical location determined in association with the user regardless of a geographical location of the cloud mail server.

15. A non-transitory computer-readable medium having stored thereon processor-executable instructions that causes a cloud-based mail system comprising a processor to perform a method comprising:
encoding an e-mail received from a terminal of a user or an external mail server with a first key, and transmitting the e-mail encoded with the first key to a cloud mail server that provides a cloud mail service, the first key being configured to be inaccessible by the cloud mail server; and
transmitting the e-mail encoded with the first key to the cloud mail server,
wherein the e-mail encoded with the first key is configured to be encoded at the cloud mail server with a second key of the cloud mail server and stored in a storage of the cloud mail server.

\* \* \* \* \*